United States Patent
Gaudet et al.

(10) Patent No.: US 7,203,932 B1
(45) Date of Patent: Apr. 10, 2007

(54) METHOD AND SYSTEM FOR USING IDIOM RECOGNITION DURING A SOFTWARE TRANSLATION PROCESS

(75) Inventors: Dean Gaudet, San Francisco, CA (US); Brian O'Clair, Foster City, CA (US)

(73) Assignee: Transmeta Corporation, Santa Clara, CA (US)

(\*) Notice: Subject to any disclaimer, the term of this patent is extended or adjusted under 35 U.S.C. 154(b) by 557 days.

(21) Appl. No.: 10/335,459

(22) Filed: Dec. 30, 2002

(51) Int. Cl.
*G06F 9/45* (2006.01)
*G06F 15/00* (2006.01)
*H04L 9/00* (2006.01)

(52) U.S. Cl. ............... 717/136; 717/151; 713/150; 712/24

(58) Field of Classification Search ............ None
See application file for complete search history.

(56) References Cited

U.S. PATENT DOCUMENTS

| | | | |
|---|---|---|---|
| 5,958,061 A * | 9/1999 | Kelly et al. | 714/1 |
| 6,199,152 B1 * | 3/2001 | Kelly et al. | 711/207 |
| 2004/0123278 A1 * | 6/2004 | Nanja et al. | 717/153 |

\* cited by examiner

*Primary Examiner*—Antony Nguyen-Ba

(57) ABSTRACT

A method for using idiom recognition during a software translation process. The method includes accessing non-native instructions of a non-native application, determining whether an instruction pattern of the non-native instructions is recognized from a previous execution, if recognized, retrieving and executing translated instructions corresponding to the non-native instructions.

26 Claims, 6 Drawing Sheets

500

METHOD AND SYSTEM FOR USING IDIOM RECOGNITION DURING A SOFTWARE TRANSLATION PROCESS

TECHNICAL FIELD

The present invention relates generally to digital computer systems. More specifically, the present invention pertains to reducing execution overhead imposed on the processing environment of a digital computer system.

BACKGROUND ART

Many types of digital computer systems utilize translation or emulation to implement software based functionality. Generally, translation and emulation both involve examining a program of software instructions and performing the functions and actions dictated by the software instructions, even though the instructions are not "native" to the computer system. In the case of translation, the non-native instructions are converted, or translated, into a form of native instructions which are designed to execute on the hardware of the computer system. Examples include prior art translation software and/or hardware that operates with industry standard x86 applications to enable the applications to execute on non-x86 or alternative computer architectures. Generally, a translation process utilizes a large number of processor cycles, and thus, imposes a substantial amount of overhead. The performance penalty imposed by the overhead can substantially erode any benefits provided by the translation process. Thus what is required is a solution that can implement a computer software translation process while reducing the overhead penalty imposed on a user.

DISCLOSURE OF THE INVENTION

Embodiments of the present invention provide a method and system for using idiom recognition during a computer software translation process to reduce the overhead penalty imposed on a user.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Figure 1:
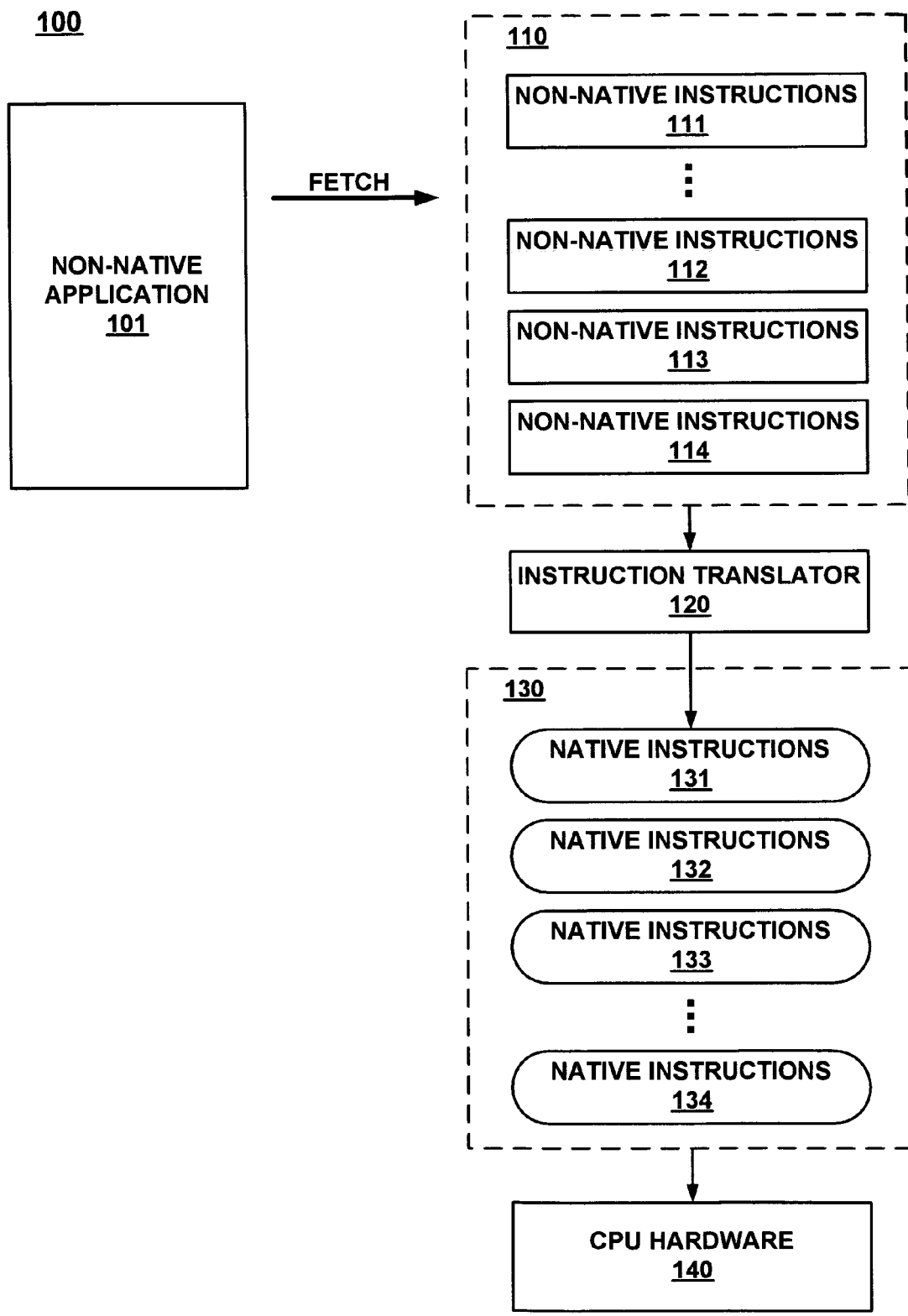
FIG. 1 shows a first diagram of the operation of a system used to implement an instruction translation process in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for using idiom recognition during a computer software translation process to reduce the overhead penalty imposed on a user. Idiom recognition is performed, wherein non-native instructions of a non-native application are accessed and a determination is made as to whether an instruction pattern of the non-native instructions is recognized from a previous execution. If the instruction pattern is recognized, translated instructions corresponding to the non-native instructions are retrieved and executed as opposed to performing a redundant translation. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "recognizing" or "retrieving" or "translating" or the like, refer to the action and processes of a computer system (e.g., computer system 500 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE PRESENT INVENTION

FIG. 1 shows a diagram of the operation of a system 100 used to implement an instruction translation process in accordance with one embodiment of the present invention. As depicted in FIG. 1, system 100 includes a non-native application 101 having its constituent instructions fetched from its storage location (e.g., memory, disk, network, etc.) to build a sequence 110, or block, of non-native instructions for processing by an instruction translator 120. The instruction translator 120 translates the non-native instructions 111–114 to generate a corresponding sequence 130 (e.g., block) of native instructions. The native instructions 131–134 comprising the sequence 130 are then executed by the CPU hardware 140 of the system 100.

Thus, the system 100 embodiment shown in FIG. 1 implements a translation process wherein the non-native application 101 is executed by the system 100 and, for example, the functionality of the non-native application 101 is provided to a user.

Depending upon the specific requirements of a particular implementation, the non-native application 101 can be an x86 application and the non-native instructions 111–114 comprising the application 101 can be x86 instructions. The CPU hardware 140 executing the translated native instructions can be a VLIW (very long instruction word) CPU hardware unit and the native instructions 131–134 fed into the CPU hardware 140 can be VLIW instructions. In such an implementation, the VLIW instructions would be configured to efficiently feed multiple pipeline front ends of the CPU hardware 140 to achieve maximum concurrency and parallelism. Descriptions of processor architectures implementing translation can be found in commonly assigned U.S. Pat. No. 5,958,061, HOST MICROPROCESSOR WITH APPARATUS FOR TEMPORARILY HOLDING TARGET PROCESSOR STATE, which is incorporated herein in its entirety.

It should be noted that other types of non-native applications can be used in the translation process of the present invention, in addition to x86 applications (e.g., SPARC, MIPS, etc.). Similarly, the native instructions generated by the translation process can be other types of instructions besides VLIW instructions. Thus, at times it can be helpful for the reader's understanding to use the terms "target instruction" and "target application" to refer to the non-native instructions and the non-native application, while the terms "host instruction" and "host architecture" are used to refer to the native instructions and the CPU hardware that executes the native instructions.

Figure 2A:
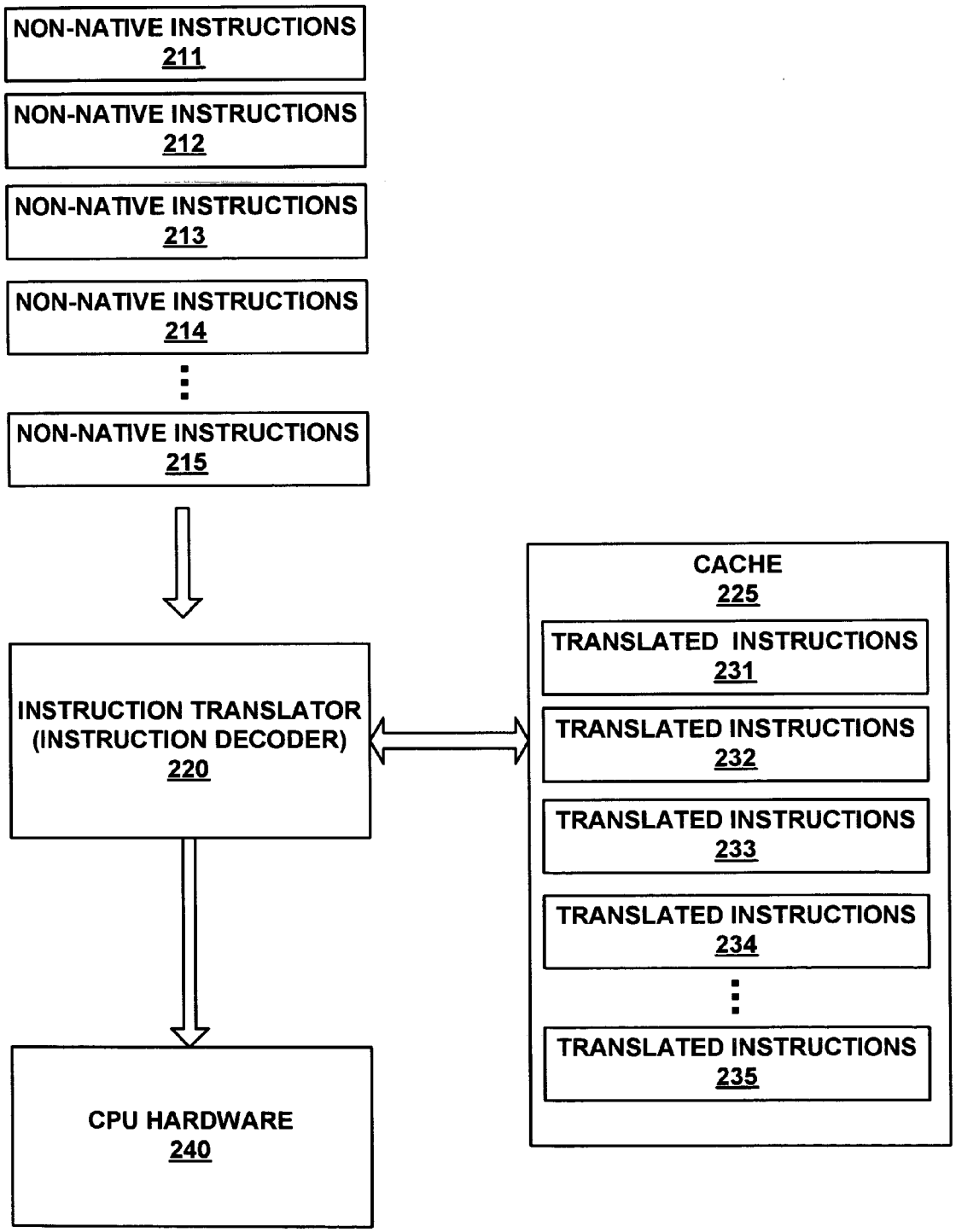
FIG. 2A shows a second diagram of the operation of a system used to implement an instruction translation process in accordance with one embodiment of the present invention.

FIG. 2A shows a diagram of the operation of a system 200 used to implement an instruction translation process in accordance with one embodiment of the present invention. As depicted in FIG. 2A, system 200 shows an instruction translator 220 for translating a series of non-native instructions 211–215, a cache 225 storing the translated instructions 231–235, and CPU hardware 240.

The system 200 embodiment functions by accessing non-native instructions from the non-native application (e.g., application 101 of FIG. 1) and translating the non-native instructions using the instruction translator 220. The instruction sequence from the non-native application is translated by the instruction translator 220 into resulting translated instructions which can natively execute on the CPU hardware 240. The resulting translated instructions (e.g., translated instruction 231) are stored within the cache memory 225. The translated instructions are executed by the CPU hardware 240 to implement the functionality of the non-native application.

Thus, in order to execute the instructions of the non-native application, the computer readable code comprising the non-native application is translated first into the translated instructions which then execute very efficiently on the CPU hardware 240. Depending upon the specifics of the non-native application, the non-native application is entirely translated, or only portions (e.g., those portions of the non-native application which are most CPU intensive) of the non-native application are translated.

In accordance with embodiments of the present invention, the translated instructions 231–235, once generated by the instruction translator 220, are stored within the cache 225 and reused as often as possible. By reusing the translated instructions 231–235, the system 200 avoids having to execute the instruction translator 220 multiple times to translate the same non-native instructions. For example, as long as the non-native application executes in-context (e.g., as a process executing on the processor as opposed to being context switched out to a swap file), the translated instructions 230 can be executed directly on the CPU hardware 240 without having to constantly re-translate the instructions using the instruction translator 220. This greatly reduces CPU overhead involved in executing the overall translation process. The reusing of the translated instructions 231–235 to implement the application functionality essentially takes the instruction translator 220 "out of the loop" and allows the CPU cycles consumed by the instruction translation process to be saved, along with saving the power consumed by executing the instruction translation process.

In accordance with embodiments of the present invention, in order to leverage the CPU cycle savings and the power savings provided by the reuse of the translated instructions 230, patterns of the non-native instructions 211–215, or "idioms" are associated with their resulting translated instructions 231–235. The patterns and their resulting translated instructions are used to avoid having to re-execute the instruction translator 220 when the same instruction pattern is encountered during a subsequent execution. For example, if a pattern of non-native instructions is encountered for a second time, all the translated instructions that correspond to that pattern are retrieved from storage and executed directly on the CPU hardware 240 as opposed to re-translating the non-native instructions of the pattern on the instruction translator 220. The pattern of non-native instructions is referred to as an idiom. If the idiom is recognized, translated instructions corresponding to the idiom are retrieved and executed as opposed to performing a redundant translation.

As shown in FIG. 2A, the translated instructions are shown residing in a cache memory 225. However, additional external memory can be used to store the translated instruction corresponding to the idioms. Such additional external memory is explicitly shown in FIG. 3 below (e.g., system memory 350 and disk storage 360).

The additional external memory is used to save larger amounts of translated instructions. To increase the amount of memory available for storage, translated instructions corresponding to the idioms can be saved outside of the cache 225 to the external storage for later reuse. This greatly increases the amount of memory available for storing translated instructions. In so doing, the translated instructions resulting from very large non-native applications, or many different non-native applications, can be stored and later accessed in order to avoid redundant use of the instruction translator 220. Avoiding redundant use of the instruction translator 220 saves the CPU cycles (e.g., CPU cycles required to implement the translation process, power consumed by the translation process, and the like) required to generate the translated instruction, thereby reducing the overhead of the translation process.

Thus, when a non-native application which has been previously translated by the instruction translator 220 is subsequently encountered (e.g., after a context switch), the translated instructions (e.g., the translated instructions 241) corresponding to the application can be accessed from a storage medium, or retrieved from the storage medium into the cache 225, and directly executed on the CPU hardware 240.

Additional descriptions of processes for using external storage for translated instructions can be found and commonly assigned U.S. patent application Ser. No. 10/335,405, A METHOD AND SYSTEM FOR USING EXTERNAL STORAGE TO AMORTIZE CPU CYCLE UTILIZATION, by Brian O'Clair et al., which is incorporated herein in its entirety.

It should be noted that in one embodiment, the instruction translator 220 can be implemented as a hardware based instruction decoder 220 as found in many types of microprocessor architectures. In such an embodiment, the instruction decoder 220 takes instructions for the application (e.g., x86 instructions) and decodes those instructions into "pipeline instructions" or "micro-architecture instructions" that efficiently feed the CPU hardware 240. For example, many processor architectures (e.g., processor environments) decode x86 instructions into more simple RISC-like micro-architecture instructions which then execute on the internal CPU hardware of the processor architecture. In such architectures, the instruction decoder generally operates continuously, continuously decoding the x86 instructions into the constituent micro-architecture instructions which are then executed by the CPU hardware.

In accordance with embodiments of the present invention, these constituent micro-architecture instructions comprise the translated instructions (e.g., translated instructions 231–235) which can be saved for reuse in the manner described above. Thus, in such an embodiment, the target instructions are the x86 instructions and the host instructions are the micro-architecture instructions which execute on the CPU hardware 240. The instruction translator/instruction decoder 220 can be software based, hardware based, or some combination thereof.

Figure 2B:
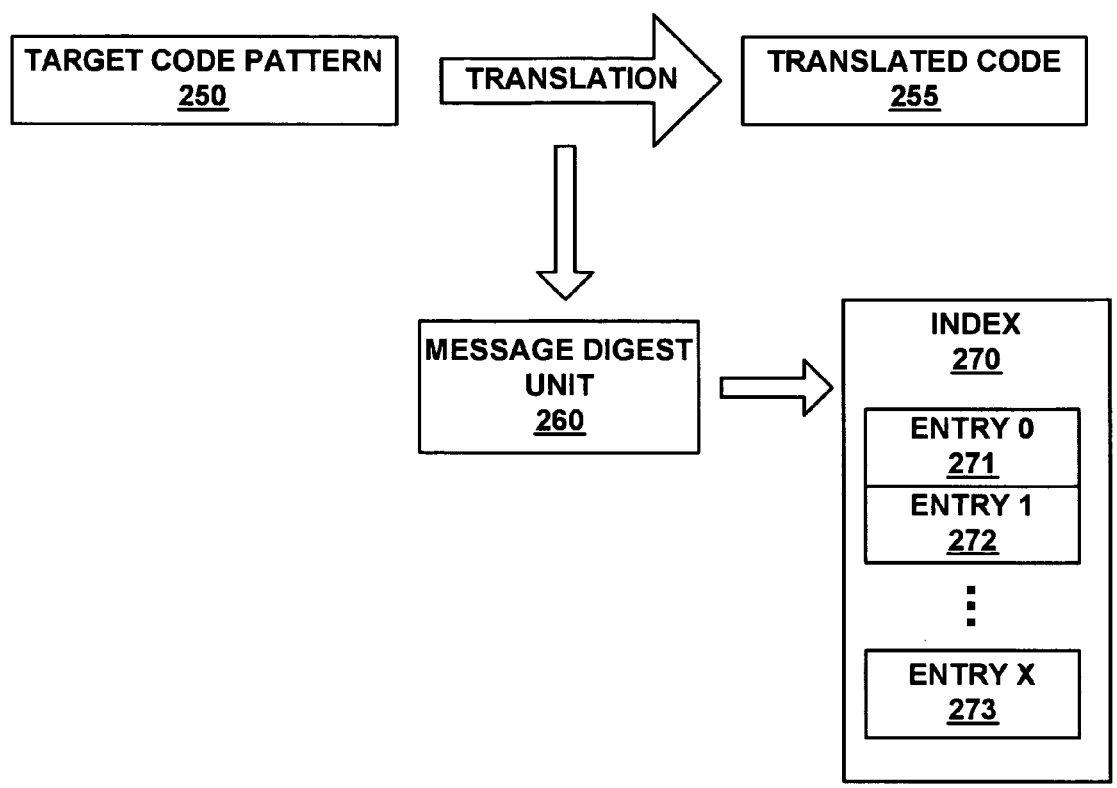
FIG. 2B shows a third diagram having additional components used in the operation of a system for implementing an instruction translation process in accordance with one embodiment of the present invention.

FIG. 2B shows additional components used in the operation of a system 200 for implementing an instruction translation process in accordance with one embodiment of the present invention. As depicted in FIG. 2B, a target instruction pattern 250 (e.g., an idiom) is shown along with its corresponding translated instruction 255.

As depicted in FIG. 2B, in order to facilitate the recognition of subsequent encounters of the target instruction pattern 250, the target instruction pattern 250 is processed using a message digest unit 260. In the present embodiment, the message digest unit 260 functions by computing a message digest for the target instruction pattern 250. This message digest is stored as one of a plurality of entries within an index 270. The index 270 comprises a table data structure within a memory. The index 270 includes a plurality of entries (e.g., entries 271–273) corresponding to the message digests of the encountered target instruction patterns (e.g., target instruction pattern 250). The entries of the index 270 associate the target instruction patterns with their corresponding resulting translated instruction (e.g., translated instruction 255).

In this manner, the index 270 enables the recognition of a subsequent encounter with a target instruction pattern and enables the translated instruction associated with the target instruction pattern to be located and retrieved. For example, upon a index 270 "hit", wherein the message digest of the target instruction pattern matches an entry of the index 270, the entry is used to locate the corresponding translated instruction. The translated instruction is then, for example, retrieved from the external storage (e.g., system memory 350 or disk storage 360 shown in FIG. 3), loaded into the cache 225, and executed on the CPU hardware 240.

It should be noted that the size and configuration of the idioms of target instructions, or non-native instructions, can be modified in accordance with the particular requirements of the computer system environment. For example, in one embodiment, the target instruction pattern 250 comprises an entire page (e.g., 4 KB) of target instructions. In such an embodiment, a message digest of the entire target instruction page is computed by the message digest unit 260 and a corresponding entry is stored in the index 270. On a subsequent encounter with the target instruction page, the message digest unit 260 recognizes the target instruction page (e.g., an index 270 hit), and the resulting translated instructions corresponding to the target instruction page is retrieved from external storage into the cache 225. The resulting translated instructions then execute directly on the CPU hardware 240. In another embodiment, the target instruction pattern 250 can comprise a small number of target instructions (e.g., as few as two). In each embodiment, the objective is to recognize recurring patterns of target instructions and leverage the stored translated instructions in order to avoid re-executing the instruction translator.

It should be noted that a number of different well-known algorithms can be used to implement the message digest unit 260. Example algorithms include MD5, SHA1, and the like. In each implementation, the objective is to compute a unique message digest that will render the chances of a collision occurring as small as possible. For example, in many implementations, the number of entries within the index 270 can be quite large. It is desirable that each entry have a unique message digest so that target instruction patterns map to unique blocks of translated instructions.

Figure 3:
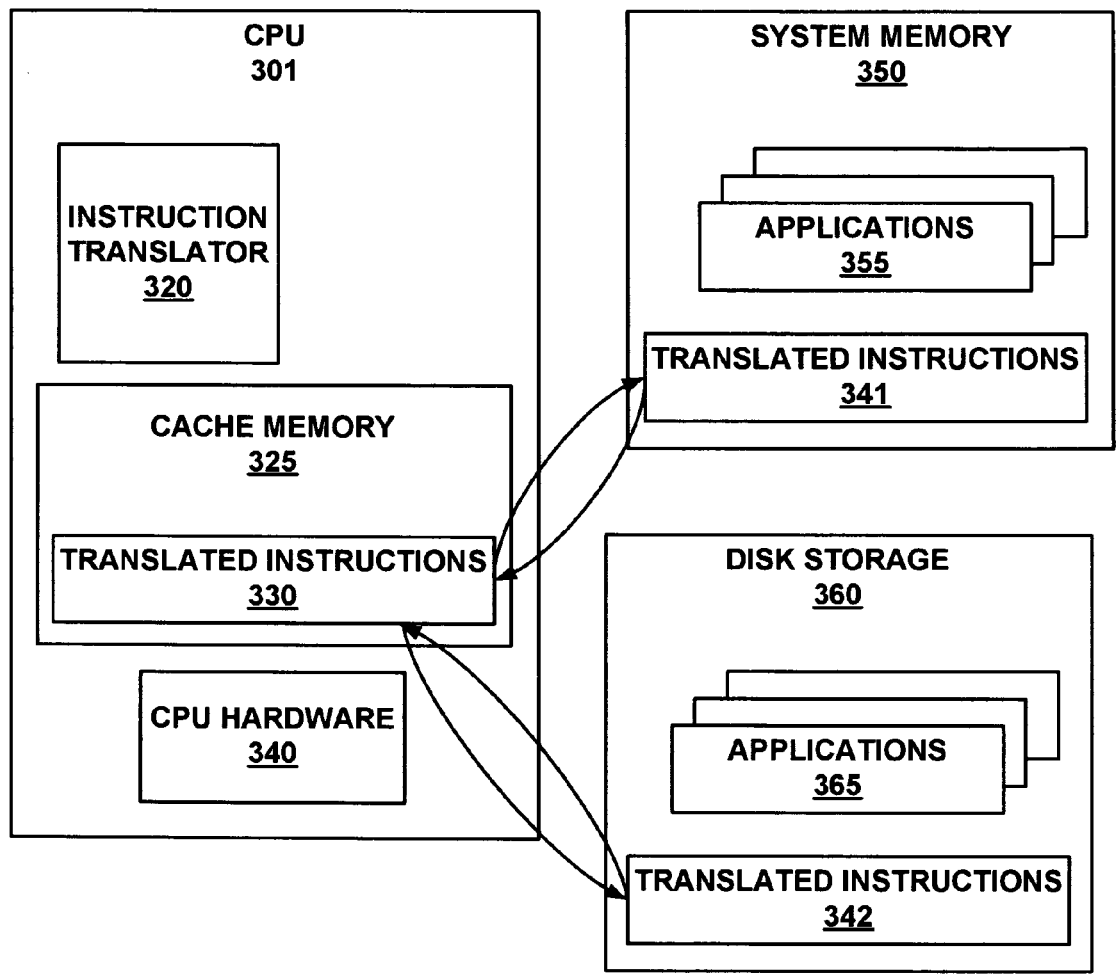
FIG. 3 shows a diagram of the external storage components of a system used to implement an instruction translation process in accordance with one embodiment of the present invention.

FIG. 3 shows a diagram of the basic components of a system 300 used to implement an instruction translation process in accordance with one embodiment of the present invention. As depicted in FIG. 3, system 300 shows a CPU integrated circuit 301 including an instruction translator 320, a cache 325 storing the translated instructions 330, and CPU hardware 340. System 300 explicitly shows a system memory 350 and a disk storage 360 that provides the external storage for the translated instructions.

In the system 300 embodiment, the CPU integrated circuit 301 provides the processor environment for the instruction translator 320, the cache 325 storing the translated instructions 330, and the CPU hardware 340. However, it should be noted that the cache memory 325 can be located external to the CPU 301. The system 300 embodiment also shows the saving of translated instructions 341 into system memory 350 and the saving of translated instructions 342 into disk storage 360. Target, or non-native, applications 355 and/or applications 356 are instantiated by first translating their instructions using the instruction translator 320 and storing the resulting translated instructions into the cache memory 325. Thus, on subsequent executions of the applications 355 and/or applications 356, the idioms of target instruction can be recognized, their associated translated instruction can be retrieved, and the CPU resources consumed by the operation of the instruction translator 320 saved by executing the stored translated instructions directly on the CPU hardware 340.

The system 300 embodiment explicitly shows storing the translated instructions 330 in both the system memory 350 and the disk storage 360. Although the system memory 350 is generally volatile, the system memory 350 typically has a much larger storage capacity in comparison to the cache memory 325. The disk storage 360 provides even greater storage capacity in comparison to the system memory 350. Additionally, the disk storage 360 is non-volatile, and can thus store the translated instructions 342 for use during multiple computing sessions (e.g., wherein the computer system is turned off between sessions). However, access to the translated instructions 342 is generally slower than access to the translated instructions 341 residing in system memory 350. Additionally, it should be noted that the index (e.g., index 270) can also be stored on disk storage 360.

Figure 4:
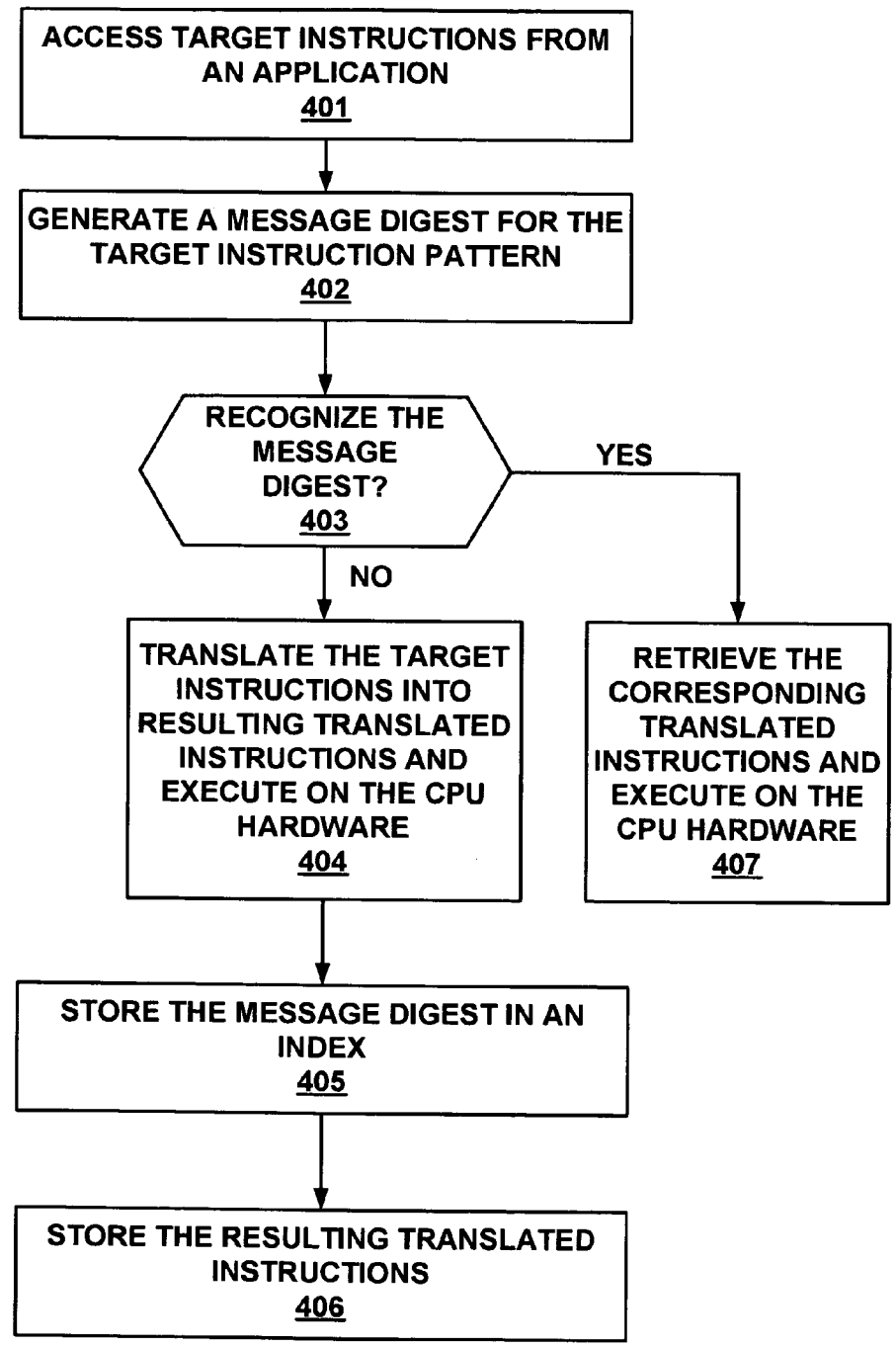
FIG. 4 shows a flowchart of the steps of a process in accordance with one embodiment of the present invention.

FIG. 4 shows a flowchart of the steps of a process 400 in accordance with one embodiment of the present invention. As depicted in FIG. 4, process 400 shows the steps involved in a idiom recognition software translation process as implemented by a computer system (e.g., system 200) in accordance with one embodiment of the present invention.

Process 400 begins in step 401, where target instructions from an application are accessed. As described above, the target instructions can be non-native instructions of a non-native application. In step 402, a message digest is generated for a target instruction pattern, or idiom. As described above, the size, type, and configuration of the target instruction pattern can be modified in accordance with the characteristics of a computer system architecture. In step 403, the message digest computed for the target instruction pattern is compared against an index to determine whether the target instruction pattern has been previously encountered. If an entry for the message digest is not found within the index, the message digest is not recognized, and process 400 proceeds to step 404.

In step 404, where the message digest is not recognized, the target instructions are translated into resulting translated instructions and the translated instructions are executed on the CPU hardware (e.g., CPU hardware 240). In step 405, an entry corresponding to the message digest is stored in the index. And in step 406, the resulting translated instructions corresponding to the target instruction pattern are stored. As described above, the translated instructions can be stored in external memory (e.g., system memory 350), on disk media (disk storage 360), or the like. Thus, on a subsequent encounter of the target instruction pattern, the target instruction pattern will be recognized and its previously translated instructions will be retrieved and executed.

In step 404, where an entry for the message digest is found within the index, the message digest is recognized, and process 400 proceeds to step 407. Subsequently, in step 407, the target instruction pattern is recognized, the entry of the index is used to retrieve the translated instructions corresponding to the target instruction pattern. The translated instructions are then executed directly on the CPU hardware.

Thus, embodiments of the present invention provide a method and system for using idiom recognition during a computer software translation process to reduce the overhead penalty imposed on a user. Idiom recognition, wherein non-native instructions of a non-native application are accessed and a determination is made as to whether an instruction pattern of the non-native instructions is recognized from a previous execution, allows previously translated instructions to be used instead of executing a re-translation. Where the instruction pattern is recognized, translated instructions corresponding to the non-native instructions are retrieved and executed as opposed to performing a resource consuming (e.g., in both CPU cycles and power) redundant translation.

Computer System Platform

Figure 5:
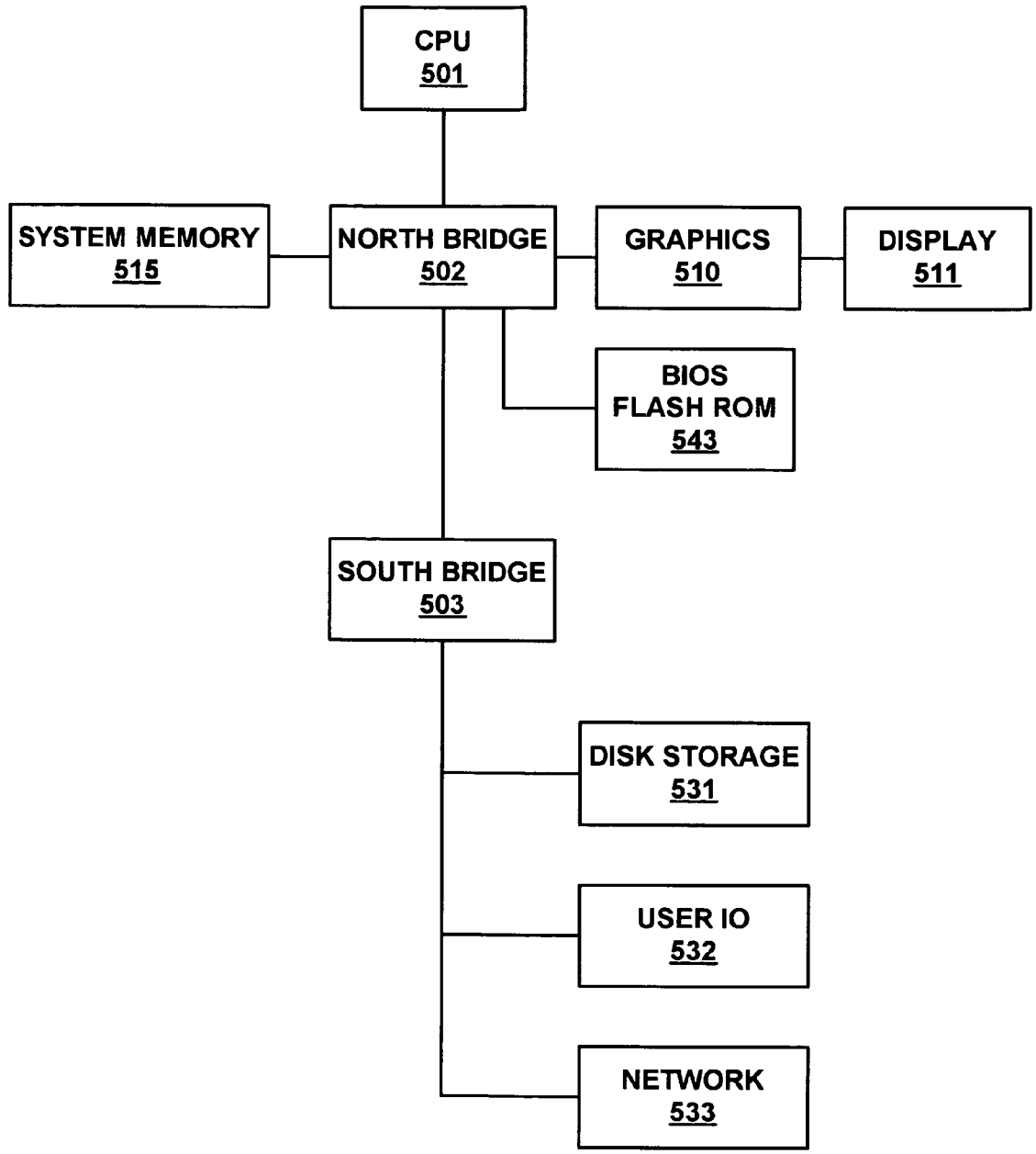
FIG. 5 shows the general components of a computer system in accordance with one embodiment of the present invention.

With reference now to FIG. 5, a computer system 500 in accordance with one embodiment of the present invention is shown. Computer system 500 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 500) and are executed by the CPU 501 of system 500. When executed, the instructions cause the system 500 to implement the functionality of the present invention as described above.

In general, system 500 comprises at least one CPU 501 coupled to a North bridge 502 and a South bridge 503. The North bridge 502 provides access to system memory 515 and a graphics unit 510 that drives a display 511. The South bridge 503 provides access to a plurality of coupled peripheral devices 531–533 as shown. Computer system 500 also shows a BIOS ROM 540 that stores BIOS initialization software.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for using idiom recognition during a software translation process, comprising:
   accessing non-native instructions of a non-native application;
   determining whether an instruction pattern of the non-native instructions is recognized from a previous execution;
   if a message digest corresponding to the instruction pattern is recognized, retrieving translated instructions corresponding to the non-native instructions; and
   executing the translated instructions.

2. The method of claim 1 further comprising:
   generating the message digest from the non-native instructions of the non-native application; and
   determining whether the instruction pattern of the non-native instructions is recognized from the previous execution by determining whether the message digest is recognized.

3. The method of claim 2 further comprising:
determining whether the instruction pattern of the non-native instructions is recognized by comparing the message digest of the non-native instructions with an index.

4. The method of claim 1 wherein the translated instructions are retrieved from an external memory.

5. The method of claim 1 wherein the translated instructions are retrieved from a disk drive.

6. The method of claim 1 wherein the instruction pattern of the non-native instructions comprises an instruction pattern of a page of non-native instructions.

7. The method of claim 6 wherein, if the instruction pattern is recognized, translated instructions corresponding to the page of non-native instructions are retrieved.

8. The method of claim 1 wherein the translated instructions comprise pipeline instructions.

9. The method of claim 8 wherein the pipeline instructions comprise VLIW instructions.

10. The method of claim 1 wherein the non-native instructions comprise x86 instructions and the non-native application comprises an x86 application.

11. A method for using idiom recognition during a software translation process, comprising:
accessing non-native instructions of a non-native application;
generating a message digest of the non-native instructions;
determining whether the instruction pattern of the non-native instructions is recognized from a previous execution by comparing the message digest with an index;
if the instruction pattern is recognized, retrieving translated instructions corresponding to the non-native instructions; and
executing the translated instructions.

12. The method of claim 11 further comprising:
determining whether the instruction pattern of the non-native instructions is recognized from the previous execution by determining whether the message digest matches an entry of the index.

13. The method of claim 12 further comprising:
if the instruction pattern is not recognized, translated the non-native instructions into resulting translated instructions;
executing the resulting translated instructions;
storing the message digest as an entry in the index; and
storing the resulting translated instructions corresponding to the message digest.

14. The method of claim 13 wherein the resulting translated instructions are stored in an external memory.

15. The method of claim 13 wherein the resulting translated instructions are stored in a disk drive.

16. The method of claim 11 wherein the instruction pattern of the non-native instructions comprises an instruction pattern of a page of non-native instructions.

17. The method of claim 16 wherein, if the instruction pattern is recognized, translated instructions corresponding to the page of non-native instructions are retrieved.

18. The method of claim 11 wherein the translated instructions comprise VLIW instructions and the non-native instructions comprise x86 instructions.

19. A computer readable media for implementing idiom recognition during a software translation process, the media storing computer readable code which when executed by a processor causes the processor to implement a method comprising:
accessing non-native instructions of a non-native application;
generating a message digest of the non-native instructions;
determining whether the instruction pattern of the non-native instructions is recognized from a previous execution by comparing the message digest with an index;
if the instruction pattern is recognized, retrieving translated instructions corresponding to the non-native instructions; and
executing the translated instructions.

20. The computer readable media of claim 19 further comprising:
determining whether the instruction pattern of the non-native instructions is recognized from the previous execution by determining whether the message digest matches an entry of the index.

21. The computer readable media of claim 20 further comprising:
if the instruction pattern is not recognized, translating the non-native instructions into resulting translated instructions;
executing the resulting translated instructions;
storing the message digest as an entry in the index; and
storing the resulting translated instructions corresponding to the message digest.

22. The computer readable media of claim 21 wherein the resulting translated instructions are stored in an external memory.

23. The computer readable media of claim 21 wherein the resulting translated instructions are stored in a disk drive.

24. The computer readable media of claim 19 wherein the instruction pattern of the non-native instructions comprises an instruction pattern of a page of non-native instructions.

25. The computer readable media of claim 24 wherein, if the instruction pattern is recognized, translated instructions corresponding to the page of non-native instructions are retrieved.

26. The computer readable media of claim 19 wherein the translated instructions comprise VLIW instructions and the non-native instructions comprise x86 instructions.

* * * * *